US 6,771,410 B1
Aug. 3, 2004

(54) NANOCRYSTAL BASED HIGH-SPEED ELECTRO-OPTIC MODULATOR (75) Inventors: George I. Bourlanoff, Austin, TX (US); Robert Lindstedt, Portland, OR (US); Harry A. Atwater, South Pasadena, CA (US); Maria Giorgi, Sherwood, OR (US); Robert J. Walters, Pasadena, CA (US); Julie D. Casperson, Santa Monica, CA (US); Pieter G. Kik, Pasadena, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/465,355

(22) Filed: Jun. 18, 2003

(51) Int. Cl.$^7$ .............................. G02F 1/03; G02B 6/00
(52) U.S. Cl. ...................... 359/248; 359/245; 385/122
(58) Field of Search ................................ 359/248, 247, 359/237, 221, 245; 250/214.1; 385/14, 129, 130, 131, 122

(56) References Cited

U.S. PATENT DOCUMENTS

| | | | |
|---|---|---|---|
| 5,323,019 A | | 6/1994 | Dutta et al. |
| 5,508,829 A | * | 4/1996 | Freeouf et al. ............... 359/3 |
| 5,550,670 A | | 8/1996 | Zielinski et al. |
| 5,825,525 A | | 10/1998 | Harwit |
| 5,920,419 A | | 7/1999 | Starck et al. |
| 6,100,543 A | | 8/2000 | Sakata |

OTHER PUBLICATIONS

Miller, D. A. B., et al., "Field–Effect Transistor Self–Electrooptic Effect Device: Integrated Photodiode, Quantum Well Modulator and Transistor," *IEEE Photonics Technology Letters*, vol. 1, No. 3, (Mar. 1989), pp. 62–64.

Partovi, A., et al., "Electroabsorption in II–VI Multiple Quantum Wells," Appl. Phys. Lett. 58 (4), (Jan. 28, 1991) American Institute of Physics, pp. 334–336.

Wang, H., "Ultrafast Recovery Time in a Strained InGaAs–AlAs p–i–n Modulator," IEEE Photonics Technology Letters, vol. 7, No. 2, (Feb. 1995), pp. 173–175.

Castagna, M. E., et al., "Quantum Dot Materials and Devices for Light Emission in Silicon," STMicroelectronics, 95121, Cantania, Italy (2002), pp.439–442.

http://hyperphysics.phy-astr.qsu.edu, "Stark Effect in Atomic Spectra", (Apr. 16, 2003).

* cited by examiner

*Primary Examiner*—Hung Xuan Dang
*Assistant Examiner*—Tuyen Tra
(74) *Attorney, Agent, or Firm*—Blakely, Sokoloff, Taylor & Zafman LLP

(57) ABSTRACT

A method and apparatus for modulating light with an array of nanocrystals. First photons are directed onto an array of nanocrystals and at least a portion of the first photons ate directed by the array of nanocrystals. In one embodiment, the array of nanocrystals emit second photons. A wavelength of the second photons is modulated responsive to a signal. In one embodiment, dopants are formed proximate to the array of nanocrystals and energy from the absorbed portion of the first photons is coupled to the dopants to cause the to emit third photons. An intensity of the third photons is modulated responsive to a signal.

30 Claims, 4 Drawing Sheets

NANOCRYSTAL BASED HIGH-SPEED ELECTRO-OPTIC MODULATOR

TECHNICAL FIELD

This disclosure relates generally to optical modulators, and in particular but not exclusively, relates to high-speed nanocrystal based electro-optic modulators.

BACKGROUND INFORMATION

Electro-optic modulators employ electric fields to manipulate light within their constituent parts and are widely used in optical data transfer and processing. Two different types of known electro-optic modulators include electro-refraction modulators and electro-absorption modulators. Electro-refraction modulators rely on changes in the index of refraction of a material induced by an applied electric field to modulate the propagation of light through the modulator. One example of an electro-refraction modulator is based on a Mach-Zehnder interferometer. An incident light beam is split into two beams that propagate through the device on different paths and are subsequently recombined. An applied electric field alters the refractive index of the material along one of the paths to produce constructive or destructive interference when the beams are subsequently recombined.

Electro-absorption modulators achieve the desired light modulation by modifiying the light absorbing properties of a material with an electric field. Materials comprising multiple quantum well ("MQW") structures are particularly suitable for use in such devices because the quantum confined Stark effect ("QCSE") allows the energy levels of the material to be shifted by significantly lower voltages than those required for most other materials. These shifts can be used to alter the light absorbing properties of a MQW-based electro-optic modulator at the wavelength of interest.

The QCSE has given rise to several innovations in electro-optic modulators. Electro-optic modulators employing QCSE have many applications in communications and special purpose computer systems. QCSE is a phenomenon which arises when an electric field is applied across the plane of heterostructure superlattices. In a quantum well at zero electric field, the electron and hole energy levels are defined by the well width, and the electrons and holes are strongly confined within the well layer. However, when an electric field is applied, the electrons and holes are moved apart and their energies are altered. This has the effect of shifting the absorption resonance, as well as, modulating the strength of absorption. This occurs because direct optical absorption of a photon above the band gap energy involves raising an electron from the valence band and putting it in the conduction band, otherwise known as the formation of an exciton (electron-hole pair).

Research is ongoing to find lower voltage, higher frequency, and more efficient electro-optic modulators. In particularly, electro-optic modulators that can be integrated with silicon semiconductor devices are of particular interest. By implementing enhanced electo-optic modulators in silicon, designers can incorporate optical functionality into mature, low cost ultra large-scale integration ("ULSI") technologies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for high speed optical modulation of light are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In short, embodiments of the present invention include a nanocrystal based high-speed clectro-optic modulator. In one embodiment, light from an optical pump is directed onto an array of nanocrystals and at least a portion of this light is absorbed by the array of nanocrystals. In response, the array of nanocrystals emit light that is wavelength modulated responsive to a signal. In another embodiment, dopants are formed proximate to the array of nanocrystals. Energy from the absorbed portion of the impinging light is coupled to the dopants causing the dopants to emit light. The light emitted from the dopants is intensity modulated responsive to a signal. These and other embodiments are described in detail below.

Figure 1:
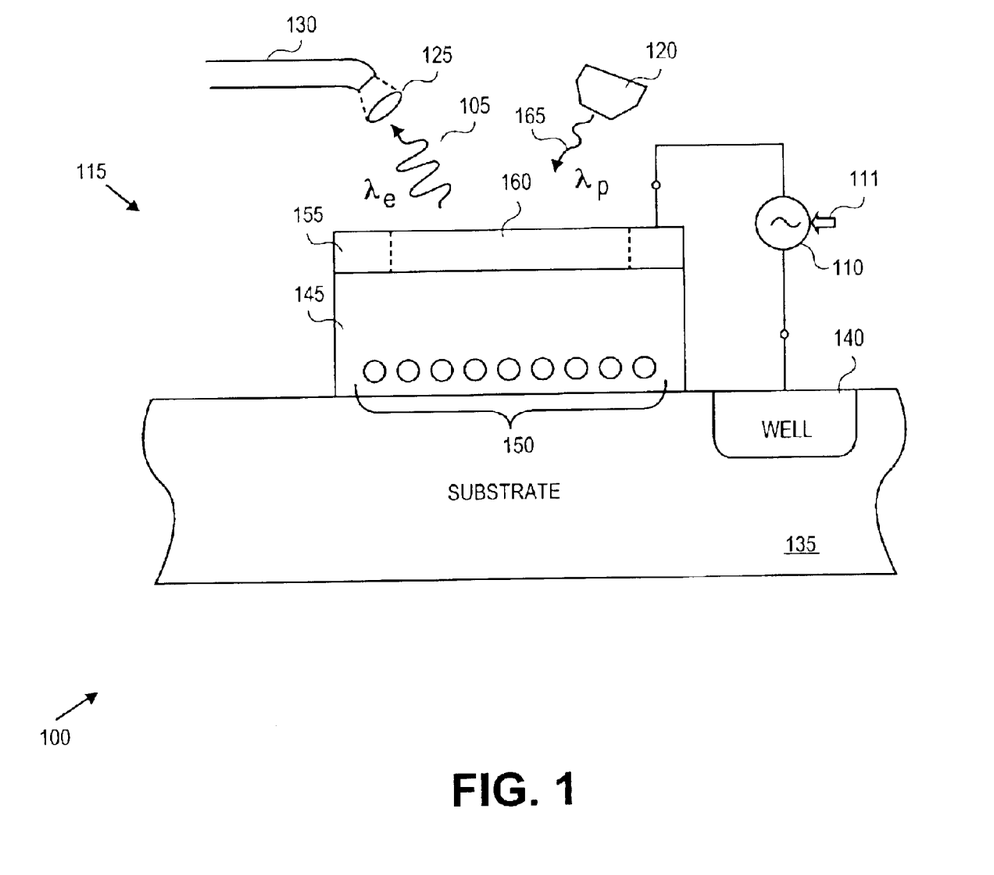
FIG. 1 is a block diagram illustrating a system including an electro-optic modulator having an array of nanocrystals for generating emitted photons having a wavelength modulated responsive to a signal, in accordance with an embodiment of the present invention.

FIG. 1 is a block diagram illustrating a system 100 for generating emitted photons 105 having a carrier wavelength $\lambda_e$ modulated responsive to a signal 111, in accordance with an embodiment of the present invention. The illustrated embodiment of system 100 includes an electro-optic modulator 115, an optical pump 120, an optical coupler 125, and an optical communication channel 130. The illustrated embodiment of electro-optic modulator 115 includes a substrate 135, a well 140, a mechanical support 145, an array of nanocrystals 150, a conductive contact 155, and a voltage generator 110.

Substrate 135 is an integral part of electro-optic modulator 115 and provides support for the other elements of electro-optic modulator 115. In one embodiment, substrate 135 is a semiconductor substrate, such as silicon. Embodiments of substrate 135 are not limited to semiconductors materials, but may be made of quartz or other materials that provide support for the other elements of electro-optic modulator 115. Mechanical support 145 supports and electrically insulates nanocrystals 150. In one embodiment, mechanical support 145 includes silicon dioxide formed over substrate 140. Embodiments of the present invention include nanocrystals 150 made of silicon (Si), gallium-arsenide (GaAs), tin (Sn), and other optically active elements or alloys that illuminate dependent upon the presence or absence of charge carriers.

Conductive contact 155 is formed on mechanical support 145 and is made of an electrically conductive material for applying a modulated voltage between conductive contact 155 and substrate 135. Conductive contact 155 further includes penetrable region 160 to allow pump photons 165 generated by optical pump 120 to enter electro-optic modulator 115 and to allow emitted photons 105 to exit electro-optic modulator 115. In one embodiment, conductive contact 155 is polysilicon patterned to form a square ring with an etched out middle section to form penetrable region 160. In one embodiment, penetrable region 160 is filled with the same material as mechanical support 145. The shape and thickness of the patterned embodiment of conductive contact 135 is not critical, as long as pump photons 165 and emitted photons 105 can penetrate conductive contact 155 to be absorbed/emitted by nanocrystals 150. In an alternative embodiment, conductive contact 155 and penetrable region 160 form a solid layer of polysilicon that is sufficiently thin to allow transmission of pump photons 165 and emitted photons 105 through conductive contact 155. This solid layer of polysilicon may have a thickness ranging between 20 nm and 200 nm. In other embodiments, conductive contact 155 is formed of a transparent layer of indium-tin-oxide, a patterned layer of metal, or the like. In all embodiments, conductive contact 155 should be sufficiently conductive to uniformly modulate an electric field across the array of nanocrystals 150.

Nanocrystals 150 are formed within mechanical support 145 above substrate 135. In one embodiment, nanocrystals 150 are positioned to form a substantially planar array. The junction between nanocrystals 150 and mechanical support 145 chemically passivates nanocrystals 150 and determines how well nanocrystals 150 will absorb pump photons 165 and generate emitted photons 105. Furthermore, the intensity of emitted photons 105 increases with the number and density of nanocrystals 150. The insulating material used to form mechanical support 150 may also be varied to optimize emission characteristics of nanocrystals 150. The carrier wavelength $\lambda_e$ of emitted photons 105 is further dependent upon the diameter of nanocrystals 150. Diameters of nanocrystals 150 may be varied according to desired design specifications such that carrier wavelength $\lambda_e$ falls within one of the infrared, visible, and ultraviolet spectrums.

In one embodiment where mechanical support 145 is a single layer of silicon dioxide and nanocrystals 150 comprise crystalline silicon, nanocrystals 150 are formed within mechanical support 145 by implantation of silicon ions. In an embodiment where mechanical support 145 is 15 nm thick, the silicon ions are implanted at a depth of approximately 9 nm into mechanical support 145 with an implantation energy of 5 keV and a dose $\approx 10^{16}$ cm$^{-2}$. Si nanocrystals 115 are then formed by annealing the Si implanted layer of silicon dioxide. Annealing times can vary depending upon the desired size of nanocrystals 115. In one embodiment, the implanted Si is annealed for approximately 30 minutes or until the nanocrystals reach a diameter of 5 nm to 10 nm.

Optical pump 120 directs pump photons 165 onto electro-optic modulator 115 to illuminate the array of nanocrystals 150. In one embodiment, optical pump 120 is a laser, such as a high power GaAs semiconductor laser configured to generate a continuous wave output. Optical coupler 125 can be an optical element capable of receiving emitted photons 105 and coupling emitted photons 105 to optical communication channel 130. In one embodiment, optical coupler 125 is a lens for focusing emitted photons 105 into optical communication channel 130, which can be a waveguide, an optical fiber or the like. In one embodiment, emitted photons 105 are emitted substantially perpendicular to substrate 135, and therefore, optical coupler 125 is positioned directly above electro-optic modulator 115. In other embodiments, emitted photons 105 are directed out of electro-optic modulator 115 via a waveguide (not shown) and subsequently coupled to optical communication channel 130 via optical coupler 125.

Embodiments of electro-optic modulator 115 operate as follows to generate emitted photons 105 having a wavelength modulation responsive to signal 111. Optical pump 120 illuminates the array of nanocrystals 150 with pump photons 165 having a wavelength $\lambda_p$. Wavelength $\lambda_p$ is related to a pump photon energy $E_P$ according to $$E_p = \hbar \cdot \frac{2\pi c}{\lambda_p} \qquad (1)$$

where $E_P$ represents the photon energy of pump photons 165, $\hbar$ is Plank's constant (1.05457×10$^{-34}$J·s), c represents the speed of light, and $\pi$ represents pi. If $E_P$ is equal to or greater than a band gap energy between a valence band and a conduction band of nanocrystals 150, then any given one of pump photons 165 in proximity with nanocrystals 150 has a statistically determinable probability of being absorbed by nanocrystals 150. Nanocrystals 150 absorb a portion of pump photons 165 and emit emitted photons 105 having carrier wavelength $\lambda_e$ in response. Carrier wavelength $\lambda_e$ of emitted photons 105 is dependent upon the band gap energy of nanocrystals 150, which is in turn dependent upon the diameter of nanocrystals 150 and the materials that form the interface between mechanical support 145 and nanocrystals 150 (e.g., silicon dioxide and crystalline silicon).

The wavelength of emitted photons 105 is modulated about carrier wavelength $\lambda_e$ by applying a modulated voltage, and hence a modulated electric field, across nanocrystals 150. The modulated electric field is generated by voltage generator 110 in response to signal 111. In one embodiment, the modulated voltage is applied by voltage generator 110 between conductive contact 155 and well 140, which is electrically coupled to substrate 135. In one embodiment, voltage generator 110 generates a peak-to-peak voltage swing of ±10V. The modulated electric field across nanocrystals 150 causes the energy band gap between the valence band and the conduction band of nanocrystals 150 to modulate, which in turn modulates the wavelength (and therefore the frequency) of emitted photons 105 about carrier wavelength $\lambda_e$. Thus, $\lambda_e$ corresponds to the band gap energy of nanocrystals 150 without the presence of an applied electric field. This phenomenon is referred to as the quantum confined Stark effect ("QCSE"). The modulation bandwidths achievable via the QCSE are in principal much faster than the modulation bandwidths achievable by modulating the excited state population for either nanocrystals 150 (e.g., silicon nanocrystals) or dopants 270 (e.g., Er dopants).

Nanocrystal based devices can also be used as electroabsorption modulators based on utilization of the QCSE. In these devices, an applied electric field can be used to polarize a quantum-confined exciton (electron hole pair) in each nanocrystal that is part of a dense array of nanocrystals. The applied electric field shifts the energy levels corresponding to the quantized valence and conduction band states in the dense array of nanocrystals, resulting in a red shift in the interband absorption of pump photons.

Figure 2:
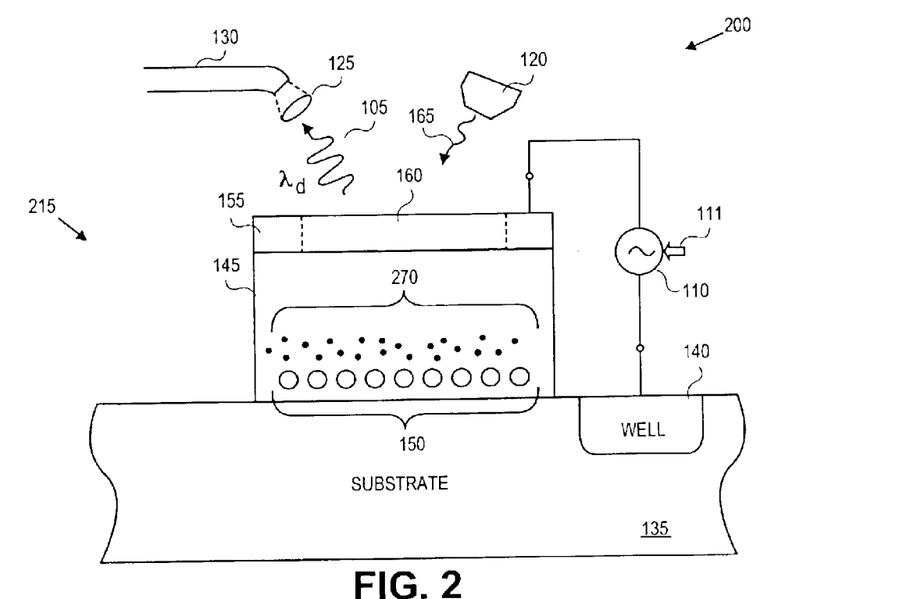
FIG. 2 is a block diagram illustrating a system including an electro-optic modulator having dopants proximate to an array of nanocrystals for generating emitted photons having an intensity modulated responsive to a signal, in accordance with an embodiment of the present invention.

FIG. 2 is a block diagram illustrating a system 200 for generating emitted photons 205 having an intensity modulation responsive to signal 111, in accordance with an embodiment of the present invention. The illustrated embodiment of system 200 includes an electro-optic modulator 215, optical pump 120, optical coupler 125, and optical communication channel 130.

The elements of system 200 are similar to system 100, except that electro-optic modulator 215 includes dopants embedded proximate to the array of nanocrystals 150 in mechanical support 145. Embedding dopants 270 proximate to nanocrystals 150 enables nanocrystals 150 to efficiently couple energy absorbed from pump photons 165 to the dopants, which in turn radiate the energy in the form of emitted photons 205. By applying a modulated electric field across nanocrystals 150 via voltage generator 110 (as described above) an intensity of emitted photons 205 is modulated responsive to signal 111. Emitted photons 205 are emitted from dopants 270 with a constant wavelength $\lambda_d$ corresponding to the atomic spectral line of dopants 270.

The energy absorbed by nanocrystals 150 is coupled to dopants 270 via a Ligand field. The amount of coupling via the Ligand field is modulated in response to the applied modulated electric field. The closer dopants 270 are embedded to the array of nanocrystals 150 without embedding dopants 270 in nanocrystals 150, the narrower the emission spectrum of emitted photons 205. Furthermore, the absorption properties of nanocrystals 150 are modulated in response to the applied modulated electric field, thereby contributing to the modulation of the coupling between nanocrystals 150 and dopants 270. Thus, an intensity modulation of emitted photons 205 responsive to signal 111 results, in place of the wavelength modulation described in connection with electro-optic modulator 115.

In one embodiments, dopants 270 are Erbium atoms. Other embodiments include Cesium dopants, Lanthanum dopants, and other rare earth elements. In one embodiment, Er atoms are imbedded into mechanical support 145 with an implantation energy 8 KeV and a dose $\approx 10^{18}$ atoms/cm$^3$.

Figure 3:
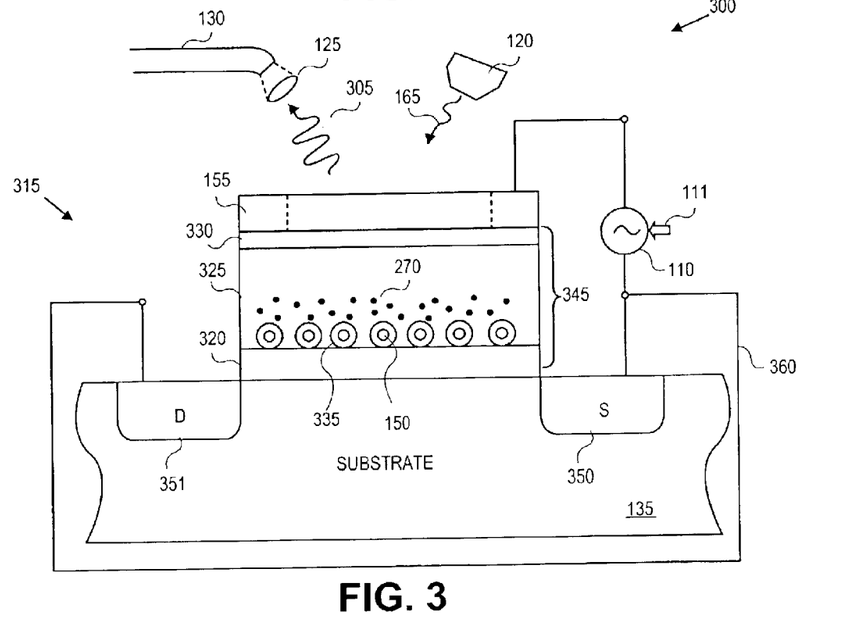
FIG. 3 is a block diagram illustrating a system including an electro-optic modulator having an array of insulated nanocrystals in a multi-layer mechanical support for generating emitted photons having an intensity modulated responsive to a signal, in accordance with an embodiment of the present invention.

FIG. 3 is a block diagram illustrating a system 300 for generating emitted photons 305 modulated responsive to signal 11, in accordance with an embodiment of the present invention. The illustrated embodiment of system 300 includes an electro-optic modulator 315, optical pump 120, optical coupler 125, and optical communication channel 130. Electro-optic modulator 315 is similar to electro-optic modulator 215, with a few exceptions including multi-layered mechanical support 345, source region 350, and drain region 351. The illustrated embodiment of mechanical support 345 includes an insulating layer 320, middle layer 325, and an insulating layer 330.

Insulating layer 320 is formed above substrate 135 and insulates middle layer 325 therefrom. Because middle layer 325 is not necessarily an electrical insulator, nanocrystals 150 are insulated with insulating shells 335. Middle layer 325 is further electrically insulated from conductive contact 115 with insulating layer 330 formed between middle layer 325 and conductive contact 330. Electrically isolating middle layer 325 with insulating layers 320 and 330 provides greater flexability in choosing materials for forming middle layer 325 based on their optical properties and the like. Embodiments of mechanical support 345 include one or more insulating layers 320 and 330 and middle layer 325 formed of silicon dioxide. In one embodiment, insulating shells 335 are made of silicon dioxide.

Electro-optic modulator 315 is formed using a transistor like structure.

One advantage of forming electro-optic modulator 315 in the transistor like structure is its case to integrate with complementary metal oxide semiconductor ("CMOS") technologies. Additionally, by electrically coupling source region 350 and drain region together via a conductor 360, an even lateral distribution of the modulated electric field across the array of nanocrystals 150 is enhanced. Thus, in the illustrated embodiment of electro-optic modulator 315, voltage generator 110 applies the modulated electric field across nanocrystals 150 by applying a modulated voltage between source region 350 and drain region 351 and conductive contact 155.

It should be appreciated that although electro-optic modulator 315 is illustrated including dopants 270, embodiments of electro-optic modulator 315 may be implemented without dopants 270 embedded within middle layer 325. In one embodiment, electro-optic modulator 315 does not include dopants 270 to generate emitted photons 305 having a wavelength modulation responsive to signal 111, as described above. In one embodiment, electro-optic modulator 315 includes dopants 270 embedded proximate to nanocrystals 150 to generate emitted photons 305 having an intensity modulation responsive to signal 111.

Embodiments of electro-optic modulator 315 may be fabricated a number of ways. In one embodiment, insulating layer 320 is first formed on substrate 135. Subsequently, ions are placed on the surface of insulating layer 320 and annealed to form nanocrystals 150. Next, insulating shells 335 can be formed around exposed nanocrystals 150 by aerosol deposition, as is known in the art. Subsequently, middle layer 325 is formed over insulating shells 335 and insulating layer 320 and dopants 270 optionally embedded using ion implantation. Insulating layer 330 and conductive contact 155 are formed there over and etched as desired.

Figure 4A:
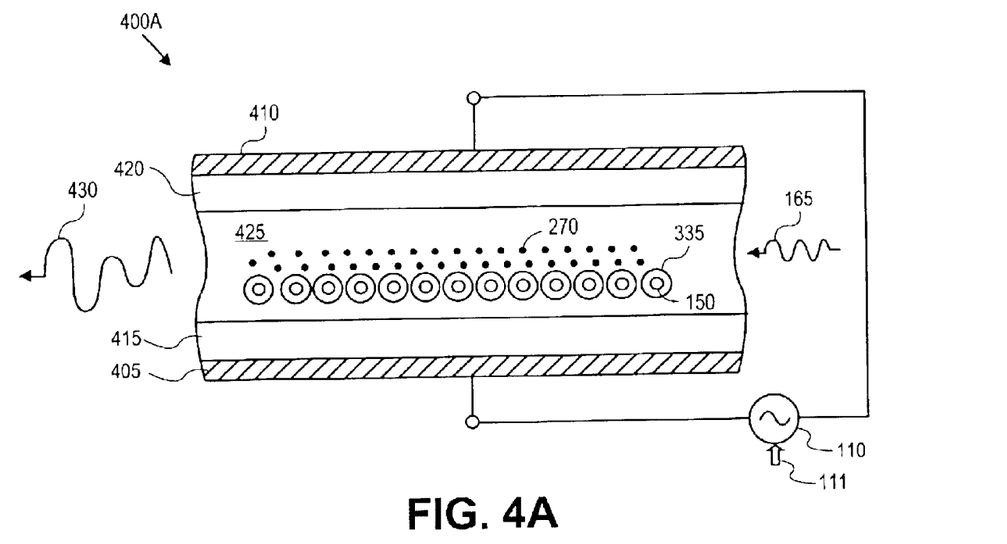
FIG. 4A is a cross-sectional view of an electro-optic modulator having an array of nanocrystals formed within a waveguide, in accordance with an embodiment of the present invention.

FIG. 4A is a cross-sectional view of an electro-optic modulator 400A having the array of nanocrystals 150 formed within an optical waveguide, in accordance with an embodiment of the present invention. The illustrated embodiment of electro-optic modulator 400A includes conductive contacts 405 and 410, cladding layers 415 and 420, core region 425, nanocrystals 150 having insulating shells 335, dopants 270, and voltage generator 110 to receive signal 111. A modulated electric field is generated across nanocrystals 150 by applying a modulated voltage between conductive contacts 405 and 410 responsive to signal 111, as described above.

Core region 425 and cladding layers 415 and 420 form the optical waveguide for guiding pump photons 165 and emitted photons 430. In one embodiment, cladding layers 415 and 420 are made of a material having a higher index of refraction than a material of core region 425. For example, core region 425 may include silicon dioxide and cladding layers 415 and 420 may include intrinsic silicon. Pump photons 165 and emitted photons 430 are therefore guided along within core region 425 via total internal reflection. In one forward-pumping configuration, pump photons 165 enter the core region 425 from one end and emitted photons 430 are generated and directed along core region 425 to exit an opposite end of core region 425. In one backward-pumping configuration, core region 425 is designed in a manner such that pump photons 165 and emitted photons 430 travel in opposite directions, as is known in the art.

In one embodiment, electro-optic modulator 400A is formed within a semiconductor substrate and integrated with other CMOS technologies. In this embodiment, the semiconductor substrate itself could form one of cladding layers 415. Therefore, as pump photons 165 and emitted photons 430 propagate along core region 425, pump photons 165 and emitted photons 430 are propagating substantially parallel to the semiconductor substrate, as opposed to substantially perpendicular as described above.

In an embodiment where dopants 270 include rare-earth elements (e.g., Erbium), electro-optic modulator 400A acts concurrently as an Erbium-doped amplifier and electro-optic modulator. The amplification characteristics are derived from stimulated emission from dopants 270 as emitted photons 430 propagate along core region 425.

Although electro-optic modulator 400A is illustrated as including dopants 270, it should be appreciated that other embodiments of electro-optic modulator 400A can exclude dopants 270. In one embodiment, electro-optic modulator 400A excludes dopants 270 (not shown) to generate emitted photons 430 having a wavelength modulation. In one embodiment, electro-optic modulator 400A includes dopants 270 to generate emitted photons 430 having an intensity modulation.

Figure 4B:
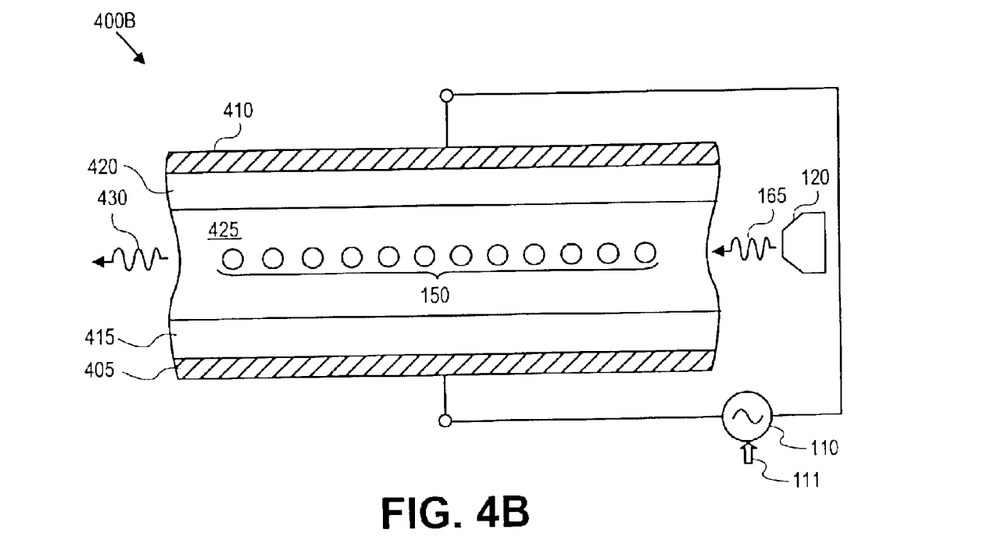
FIG. 4B is a cross-sectional view of an electro-optic modulator having an array of nanocrystals formed within a waveguide and stimulated by an external optical pump.

FIG. 4B is a cross-sectional view of an electro-optic modulator 400B having the array of nanocrystals 150 formed within an optical waveguide and stimulated by optical pump 120, in accordance with an embodiment of the present invention. The illustrated embodiment of electro-optic modulator 400B includes conductive contacts 405 and 410, cladding layers 415 and 420, core region 425, nanocrystals 150, and voltage generator 110 to receive signal 111. A modulated electric field is generated across nanocrystals 150 by applying a modulated voltage between conductive contacts 405 and 410 responsive to signal 111, as described above.

Core region 425 and cladding layers 415 and 420 form the optical waveguide for guiding pump photons 165 and emitted photons 430. In one embodiment, cladding layers 415 and 420 are made of a material having a higher index of refraction than a material of core region 425. For example, core region 425 may include silicon dioxide and cladding layers 415 and 420 may include intrinsic silicon. Pump photons 165 and transmitted photons 430 are therefore guided along within core region 425 via total internal reflection. In one forward-pumping configuration, pump photons 165 enter the core region 425 from one end and transmitted photons 430 are directed along core region 425 to exit an opposite end of core region 425.

In one embodiment, electro-optic modulator 400B is formed within a semiconductor substrate and integrated with other CMOS technologies. In this embodiment, the semiconductor substrate itself could form one of cladding layers 415. Therefore, as pump photons 165 and transmitted photons 430 propagate along core region 425, pump photons 165 and emitted photons 430 are propagating substantially parallel to the semiconductor substrate, as opposed to substantially perpendicular as described above.

In one embodiment, optical pump 120 is integrated in-line with electro-optic modulator 400B to pump nanocrystals 150 with pump photons 165. In one embodiment, optical pump 120 is a continuous wave emission source to generate pump photons 165 having a continuous wave. In response to pump photons 165, nanocrystals 150 emit emitted photons 430 having a wavelength modulation responsive to the modulated electric field, as described above.

Figure 5:
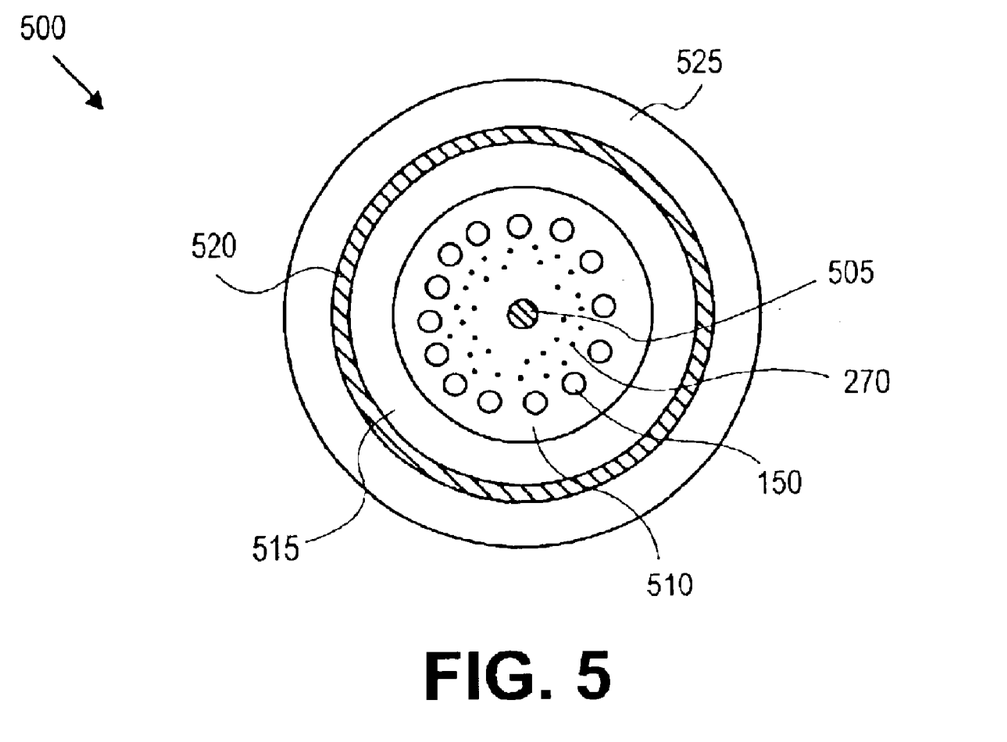
FIG. 5 is a cross-sectional view of an electro-optic modulator having an array of nanocrystals formed within an optical fiber having a center conductor and an exterior conductor, in accordance with an embodiment of the present invention.

FIG. 5 is a cross-sectional view of an electro-optic modulator 500 having an array of nanocrystals 150 formed within an optical fiber, in accordance with an embodiment of the present invention. The illustrated embodiment of electro-optic modulator 500 includes a center conductor 505, a core 510 having nanocrystals 150 and dopants 270 embedded therein, a cladding 515, an exterior conductor 520, and a jacket 525.

In one embodiment, center conductor 505 runs radially through the center of core 510. Dopants 270 are embedded within core 510 to encircle center conductor 505 along the length of the optical fiber. In the illustrated embodiment, nanocrystals 150 are formed within core 510 proximate to dopants 270, but positioned at a radial distance further from center conductor 505. It should be appreciated that other embodiments of electro-optic modulator 500 include dopants 270 positioned at a radial distance further from center conductor 505 compared to nanocrystals 115, alternating concentric circles of dopants 270 and nanocrystals 150, and various other geometries. Cladding 515 encircles core 510 to confine pump photons and emitted photons guided within electro-optic modulator 500. Exterior conductor 520 encircles cladding 515, followed by an optional outer jacket 525 to protect the inner layers. It should be appreciated that electro-optic modulator 500 is only one embodiment and that other layers may be added, as is known in the art.

By coupling a voltage generator responsive to a signal between center conductor 505 and exterior conductor 520, a modulated electric field is applied across nanocrystals 150. As described above, the modulated electric field causes dopants 270 to generate emitted photons having a modulated intensity when nanocrystals 150 are stimulated with pump photons. Furthermore, dopants 270 provide an amplification function similar to an Erbium-doped fiber amplifier ("EDFA"). It should be appreciated that embodiments of electro-optic modulator 500 can exclude dopants 270 to generate emitted photons having a wavelength modulation.

It should be appreciated that the materials, dimensions, and wavelengths utilized in the embodiments discussed in connection with FIG. 1 through FIG. 5 are provided for explanation purposes and that other materials, dimensions, and wavelengths may be utilized in accordance with the teachings of the present invention. The relative size, shape and distances between the elements of the various embodiments of the present invention are in some instances exaggerated for clarity and are not necessarily shown to scale. For example, only one orientation of the dopants in relation to the nanocrystals has been illustrated for demonstrative purposes in FIGS. 1–5; however, the dopants may surround nanocrystals in any number of ways and orientations, as long as they are positioned proximate thereto.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   directing first photons onto an array of nanocrystals having dopants proximate thereto, the array of nanocrystals to absorb at least a portion of the first photons and to couple energy from the absorbed portion of the first photons to the dopants to cause the dopants to emit second photons; and
   modulating an intensity of the second photons responsive to a signal.

2. The method of claim 1 wherein modulating the intensity of the second photons includes applying a modulated electric field across the array of nanocrystals responsive to the signal.

3. The method of claim 1, further comprising electrically insulating the array of nanocrystals within a layer of silicon dioxide disposed above a semiconductor material layer.

4. The method of claim 3 wherein the second photons are emitted substantially perpendicular to the semiconductor material layer.

5. The method of claim 1, wherein directing the first photons onto the array of nanocrystals includes directing the first photons with a waveguide, the array of nanocrystals and the dopants embedded within the waveguide and further comprising directing the second photons through the waveguide.

6. The method of claim 5, wherein the waveguide comprises an optical fiber and wherein modulating the intensity of the second photons includes modulating an electric field between a center conductor and an exterior conductor of the optical fiber.

7. The method of claim 5 wherein directing the second photons through the waveguide includes directing the second photons through the waveguide disposed in a semiconductor material layer, the first and second photons propagating substantially parallel to the semiconductor material layer.

8. A method, comprising:
   directing first photons onto an array of nanocrystals, the array of nanocrystals to absorb at least a portion of the first photons and to emit second photons; and
   modulating a wavelength of the second photons responsive to a signal.

9. The method of claim 8 wherein modulating the wavelength of the second photons includes applying a modulated electric field across the array of nanocrystals responsive to the signal.

10. The method of claim 9, wherein directing the first photons onto the array of nanocrystals includes directing the first photons with a waveguide, the array of nanocrystals embedded within the waveguide and further comprising guiding the second photons within the waveguide.

11. The method of claim 9, wherein directing the first photons includes directing the first photons having a wavelength corresponding to an energy level at least equal to a band gap energy of the array of nanocrystals.

12. An electro-optic modulator, comprising:
    an array of nanocrystals embedded within a mechanical support;
    a plurality of dopants embedded within the mechanical support proximate to the array of nanocrystals; and
    an electric modulator coupled to apply a modulated electric field across the array of nanocrystals, the plurality of dopants to emit first photons having an intensity modulation responsive to the modulated electric field when second photons are directed onto the array of nanocrystals through the mechanical support.

13. The electro-optic modulator of claim 12 wherein the mechanical support is a multi-layer mechanical support having at least one insulating layer.

14. The electro-optic modulator of claim 12, further comprising a semiconductor material layer, and wherein the mechanical support includes a layer of silicon dioxide formed above the semiconductor material layer.

15. The electro-optic modulator of claim 14 wherein the electric modulator comprises:
    a conductive contact having a region penetrable by the first and second photons formed above the layer of silicon dioxide; and
    a voltage generator to apply the electric field between the semiconductor material layer and the conductive contact responsive to the signal.

16. The electro-optic modulator of claim 12 wherein the array of nanocrystals comprises an array of crystalline silicon nanocrystals.

17. The electro-optic modulator of claim 12 wherein the plurality of dopants comprises a plurality of rare-earth dopants.

18. The electro-optic modulator of claim 17 wherein the plurality of rare-earth dopants includes a plurality of Erbium dopants.

19. The electro-optic modulator of claim 12 wherein the mechanical support comprises an optical waveguide for directing the first and second photons.

20. The electro-optic modulator of claim 19 wherein the electric modulator includes a center conductor extending through a center of the waveguide and an exterior conductor surrounding an exterior of the waveguide, the modulated electric field applied between the center conductor and the exterior conductor.

21. An electro-optic modulator, comprising:
    an array of nanocrystals embedded within a mechanical support; and
    an electric modulator coupled to apply a modulated electric field across the array of nanocrystals, the array of nanocrystals to emit first photons having a wavelength modulation responsive to the modulated electric field.

22. The electro-optic modulator of claim 21 wherein the mechanical support includes a layer of silicon dioxide formed above a semiconductor material layer.

23. The electro-optic modulator of claim 22 wherein the electric modulator comprises:

a conductive contact having a region penetrable by the first and second photons formed above the layer of silicon dioxide; and a voltage generator to apply the electric field between the semiconductor material layer and the conductive contact responsive to the signal.

24. The electro-optic modulator of claim 23 wherein the second photons are to be emitted substantially perpendicular to the semiconductor material layer.

25. The electro-optic modulator of claim 21 wherein the array of nanocrystals comprises an array of crystalline silicon nanocrystals.

26. The electro-optic modulator of claim 21 wherein the mechanical support comprises an optical waveguide for directing the first and second photons.

27. A system, comprising:

an array of nanocrystals embedded within a mechanical support;

a plurality of dopants embedded within the mechanical support proximate to the array of nanocrystals;

an electric modulator coupled to apply a modulated electric field across the array of nanocrystals, the plurality of dopants to emit first photons having an intensity modulation responsive to the modulated electric field when second photons are directed onto the array of nanocrystals through the mechanical support;

an optical coupler to receive the first photons emitted from the mechanical support; and an optical communication channel coupled to the optical coupler to transmit the first photons.

28. The system of claim 27, further comprising a continuous wave optical pump to generate the second photons.

29. The system of claim 27, further comprising a semiconductor material layer and wherein the mechanical support includes a layer of silicon dioxide formed above the semiconductor material layer, the layer of silicon dioxide to electrically insulate the array of nanocrystals.

30. The system of claim 29 wherein the dopants include Erbium.

* * * * *